United States Patent Office 2,921,923
Patented Jan. 19, 1960

2,921,923

PROCESS OF PRODUCING IMPROVED EPOXY RESIN COMPOSITIONS

Pieter Bruin, Hendricus Anthonius Oosterhof, and Jan Selman, Amsterdam, Netherlands, assignors to Shell Development Company, New York, N.Y., a corporation of Delaware No Drawing. Application December 1, 1955
Serial No. 550,480

Claims priority, application Netherlands
December 23, 1954

11 Claims. (Cl. 260—47)

This invention relates to a process for producing epoxy resin compositions containing polycarboxylic acid anhydrides, which compositions have improved working life.

As is known, epoxy resins or ethoxyline condensates which are glycidyl polyethers of polyhydric phenols may be prepared by the reaction of di- or poly-hydric phenols with epichlorohydrin in an alkaline medium. When a dihydric phenol such as 2,2-bis(4-hydroxyphenyl)propane is used, reaction products are obtained comprising particularly molecules having a structure represented by the following formula:

in which R represents a divalent diphenylene propane radical and n is either an integer or 0. The terminal groups may be to a greater or lesser extent phenol groups, derived from the polyhydric phenol used while a part of the glycide groups may also be present in a hydrated form. The epoxy resins used according to the invention have an average number of epoxy groups per molecule which is greater than 1. In preparing the epoxy resins, the corresponding bromine compounds may be used instead of epichlorohydrin or dichlorohydrin.

Suitable di- or polyhydric phenols from which the epoxy resins to be used according to the invention are derived may be mononuclear, such as alkylated or unalkylated resorcinols, catechols, pyrogallols and hydroquinones, or polynuclear, such as 2,2-bis(4-hydroxyphenyl) propane, 4,4'-dihydroxybenzophenone, 1,1-bis(4-hydroxyphenyl)ethane, etc. The epoxy resins derived from 2,2-bis(4-hydroxyphenyl) propane are particularly preferred. Condensation products of phenols such as phenol or cresol with aldehydes such as formaldehyde, may also, if desired, be used as the polyhydric phenol. Other reactants used for preparation of various epoxy resins and methods suitable for their production are described in U.S. Patents 2,682,514 and 2,709,690.

Crude epoxy resins are normally washed to remove the formed alkali metal salts and the excess alkali present at the end of the condensation reaction. This washing occurs by treating the resins with water to which, if necessary, a sufficient quantity of acid is added to neutralize the alkali present in the condensation products. The washing water obtained from such a washing treatment with very dilute acid is accordingly neutral or shows only a very weak acid reaction. If the washing water obtained shows a very weak acid or neutral reaction, many difficulties occur during the washing. The last residues of the undesired products are very difficult to remove within the narrow temperature limits at which the washing treatment can be carried out. At too low a temperature, the condensation products are so viscous that it is no longer possible to wash them, whereas if the washing treatment is carried out at too high a temperature, the condensation products are dispersed and the dispersion obtained cannot be washed.

It has now been found that to overcome the above drawbacks, it is essential that the condensation products formed should be washed for a period with water acidified so that the acidity of the washing water during the treatment does not exceed 5.5, after which the excess acid is removed by washing with water. The acids used for acidifying the water may be either organic, e.g. formic acid, acetic acid, etc., or inorganic, e.g. HCl, $H_2SO_4$.

Before being washed with the strongly acidified water, the condensation products are usually washed with water once or several times in order to remove the greater part of the undesired components such as the excess alkali. The water to be used for the above washing treatments is preferably steam condensate or distilled water. Water purified by means of ion exchangers may also be very suitably used.

The advantages obtained by this method are probably due to the fact that as a result of the treatment with strongly acidified water, the product to be washed is subjected to an unexpected physical change of structure, as a result of which the undesired products can be removed with greater ease and rapidity and the treatment can be carried out within wider temperature limits. Thus it becomes possible to wash at a higher temperature without a dispersion being formed. Furthermore, the products thus washed were found to be clearer than had hitherto been the case.

According to the process of the invention, a polycarboxylic acid anhydride is mixed with the epoxy resin which has been subjected to the washing with acidified water followed by removal of excess acid with further washing with water. The washing treatments are effected with the epoxy resin in molten condition so that the aqueous treating medium is brought in intimate contact with the resin. This is readily accomplished by using a temperature above the melting point of the resin and stirring the mixture of resin and washing medium. As pointed out above, the washing with acidified water at the low pH used in the method of this invention, permits washing without difficulty at higher temperatures. Usually temperatures up to about 25° C. above the melting point of the resin are used although higher temperatures may be used if desired. The viscosity of the resin is less at temperatures appreciably above the resin melting point, and consequently, the stirring and mixing of the resin with the treating medium is easier. In those cases where the temperature is above the boiling point of the treating medium, at least sufficient pressure is used to keep the medium liquid. As is known, the melting point of the epoxy resin is dependent primarily upon the particular polyhydric phenol used in preparing the resin and upon the molecular ratio of the halohydrin to the phenol employed. By increasing the proportion of halohydrin to phenol, the melting point of the resulting resin decreases. In order that the resin will contain an average of more than one epoxy group per molecule, there is used more than one molecular proportion of the halohydrin per phenolic hydroxyl equivalent of the phenol, and the condensation is effected with utilization of an excess of alkali metal hydroxide over that needed to combine with the halogen of the halohydrin, preferably as an aqueous solution thereof. Thus, for example, in condensing a dihydric phenol with epichlorohydrin, about 1.1 to 1.8 moles of epichlorohydrin per mole of dihydric phenol are used with about a 5 to 30% molecular excess of hydroxide over the amount of epichlorohydrin. Although not essential, it is advantageous to wash the resulting alkali metal salt and excess alkali from the crude reaction mixture with water before subjecting the epoxy resin to the acidic washing treatment of the present invention.

No special means are need for bringing the wash waters into contact with the molten resin so long as good mixing is achieved as by agitating the mixture. It is convenient to pump the aqueous medium below the surface of the resin, preferably while stirring the mass. Since the resin is usually more dense than the medium, the aqueous upper layer is separated by decantation. After the washing treatments have been completed, residual water is removed from the resin by heating and evaporation, preferably at about 20 to 100° C. above the melting point of the resin. This is likewise more efficiently accomplished while stirring or otherwise agitating the resin, preferably with application of subatmospheric pressure or vacuum.

The distinguishing feature of the products of the present invention is that the mixture of polybasic acid anhydride and specially treated epoxy resin while molten has the property of retaining workable viscosity for longer time than corresponding mixtures known heretofore. In the language of the trade, the molten compositions of the invention are characterized by desirably long "pot life." This is very advantageous in using the compositions. Upon being heated in the range of about 50° C. to 200° C. and while molten or liquid, the compositions cure and harden to insoluble and infusible solids. They are thus suited for many uses such as fabrication of articles, encapsulation of electrical equipment, manufacture of laminates, utilization as adhesives, etc. However, all of these uses require that the compositions be in a liquid state so they can be poured, shaped and the like before they set up to the final solid state. Furthermore, it is most desirable that the molten compositions retain a workable viscosity or shapeable consistency for a reasonably long period so that time will be available to permit the fabrication operations needed in using the compositions. In this respect, the compositions of the invention are outstanding in pot life properties as compared to similar compositions containing epoxy resins which have not been subjected to the acidic washing procedure of the present invention.

If on washing the epoxy resin, the acidity of the washing water exceeds 5.5, the above advantages, e.g. the structural change of the reaction product to be washed, and the improved working time of a mixture consisting of the resin and a polybasic organic acid anhydride, are not obtained. In particular, a sufficiently strongly acidified solution is used for washing that the pH of the washing water obtained lies between 4.5 and 2. Washing is preferably carried out for more than 15, particularly for 30–120, minutes with acidified water.

It has also been found according to the invention that the working time of a mixture of an epoxy resin and a polybasic organic acid anhydride such as phthalic anhydride can also be further improved by using the above method of washing on an epoxy resin prepared by not adding at once the whole quantity of alkali required for the conversion at the beginning of the reaction, but portionwise or continuously during the reaction.

By combining the batchwise or continuous addition of alkali with the above washing method a far smaller quantity of by-products are formed with are unwanted in view of the working time, and a very effective washing is obtained.

The improved compositions are prepared by mixing a polycarboxylic acid anhydride with the specially treated epoxy resin. Any of the anhydrides known to cure and harden epoxy resins are suitable for this purpose. Reference is made in particular to such polybasic carboxylic acid anhydrides as phthalic anhydride, maleic anhydride, tetrahydrophthalic anhydride, pyromellitic acid mono- and di-anhydride, succinic acid anhydride, chlorosuccinic acid anhydride, dichlorosuccinic acid anhydride, glutaric acid anhydride, adipic acid anhydride, beta-methyladipic acid anhydride, dichloromaleic acid anhydride, citraconic acid anhydride, ethane tetracarboxylic acid di-anhydride, and pentane-2,2,4,4-tetracarboxylic acid di-anhydride. Because of low cost and excellent performance, phthalic and maleic anhydrides are preferred.

Various methods may be used for mixing the anhydride with the epoxy resin. Since both the anhydride and epoxy resin are usually solids at ordinary temperature of say 20–25° C., the two substances may simply be brought together as solids to form the composition of the invention. In such case, it is preferable to finely divide or powder the substances before mixing. Such solid mixtures may be stored for long periods at ordinary temperature. Upon being melted and heated at curing temperature, they harden to the final infusible state. If desired, the anhydride and epoxy resin may be melted together to form the mixture of the composition. In this case, the mixture may be cooled and solidified and the solid composition will have reasonable storage life, or the liquid mixture may be put to its intended use while still liquid. The mixing may also be effected by combining the anhydride and resin in solution followed, if desired, with evaporation of the solvent. In order that eventual cure by heating to the infusible state will occur so as to give a product of high strength, the proportion of anhydride to epoxy resin in the mixture of the invention is preferably such that it contains about 0.75 to 1.25 anhydride groups per epoxide group. If desired, pigments, dyes, fillers, etc. may also be incorporated in the new compositions.

The invention is further illustrated by the following examples.

EXAMPLE I

A solution of 152 g. of 2,2-bis(4-hydroxyphenyl) propane in 402 g. of 9% aqueous sodium hydroxide was brought to a temperature of 50° C. in a stirred reaction vessel, after which 101.8 g. of epichlorohydrin were added. As a result of the reaction heat liberated during the condensation which occurred, the temperature of the reaction mixture rose to 72° C. in approximately 9 minutes. The reaction mixture was afterwards heated to such an extent that 20 minutes after the commencement of the reaction the temperature was 90–92° C. The reaction temperature was kept at this temperature for 10 minutes, after which a further quantity of 82.8 g. of 9% aqueous sodium hydroxide was added. The mixture obtained was then kept at a temperature of 90–92° C. for an additional 30 minutes.

The temperature was then reduced to 70° C. by adding cold distilled water, at which temperature the excess of dilute aqueous alkali was largely removed. In order to remove most of the alkali occluded in the condensation products formed, these products were washed for 10 minutes with 400 cub. cm. of distilled water at a temperature of 62–70° C. This washing treatment was repeated with a sufficient number of times for only 0.5–1 cub. cm. of 0.1 N $H_2SO_4$ to be required to neutralize 250 cub. cm. of the washing water obtained.

The product thus previously washed was then treated with 400 cub. cm. of distilled water acidified until the washing water obtained had a pH as indicated in Table I below.

The acid washing water was removed and the product obtained then washed a number of times for 10 minutes with 400 cub. cm. distilled water until the washing water showed a neutral reaction. Finally the washed product was dried by heating it to a temperature of 130° C.

Table I below shows a number of tests in which the washing was carried out under different conditions.

It was found that the products washed according to test 1 could not be washed at 70° C.; the maximum temperature to be used for washing was found to be 64° C. In tests 2 and 3 it was found possible to carry out the washing treatment at 70° C., while in the remaining tests the products could be readily washed at a temperature of 70° C.

Table III

| Test | Washing treatment with distilled water for 10 minutes | | Washing treatment with 400 cu. cm. distilled water to which was added sufficient HCOOH for the pH of the washing water obtained to amount to 2.7–3.1 | | After treatment with distilled water for 10 minutes | |
|---|---|---|---|---|---|---|
| | Numbers of Treatments | Temp. in ° C. | Time in minutes | Temp. in ° C. | Numbers of Treatments | Temp. in ° C. |
| 11 | 3 | 62–70 | 15 | 62 | 5 | 62 |
| 12 | 3 | 60–70 | 30 | 62 | 5 | 62 |
| 13 | 3 | 62–65 | 45 | 62 | 5 | 62 |
| 14 | 3 | 60–70 | 120 | 62 | 5 | 62 |

Table I

| Test | Washing treatment with distilled water for 10 minutes | | Treatment with acidified distilled water | | | | After treatment with distilled water for 10 minutes | | Total duration of the washing treatment |
|---|---|---|---|---|---|---|---|---|---|
| | Times | Temperature, ° C. | Type of Acid | pH of the washing water obtained | Duration of treatment (in minutes) | Temperature, ° C. | Times | Temperature, ° C. | |
| 1 | 3 | 62–70 | | | 40 | 58–60 | 4 | 59–60 | 110 |
| 2 | 2 | 64–68 | HCOOH | 3.9 | 37 | 62–68 | 3 | 68–70 | 87 |
| 3 | 3 | 62–70 | HCOOH | 5 –5.2 | 30 | 62 | 1 | 62 | 70 |
| 4 | 3 | 60–70 | HCOOH | 2.7–3.1 | 30 | 62 | 5 | 62 | 110 |
| 5 | 3 | 62–70 | HCOOH | 2.4–2.7 | 30 | 62 | 6 | 62 | 120 |
| 6 | 3 | 63–70 | HCOOH | 2.7–3.1 | ¹40 (27) | 62–70 | 4 | 70–74 | 10 |
| 7 | 2 | 64–66 | HCl | 2.7 | ¹41 (18) | 64–68 | 3 | 68–70 | 91 |
| 8 | 3 | 63–70 | HCl | 2.7 | ¹40 (18) | 66–72 | 4 | 70–74 | 110 |
| 9 | 3 | 63–70 | H₂SO₄ | 2.7–3.1 | ¹43 (28) | 60–70 | 4 | 70–74 | 113 |
| 10 | 3 | 60–70 | CH₃COOH | 3.5 | ¹40 (35) | 59–70 | 4 | 64–74 | 110 |

¹ The figures in parentheses show the time during which the washing water actually had the pH value indicated in the previous column. The remaining time was found to be necessary in order to reach this value.

The properties of the products washed according to the preceding table were as follows:

Table II

| Product treated according to test | Melting point in ° C. | Epoxy equivalent weight | Working time in minutes¹ | EM² |
|---|---|---|---|---|
| 1 | 54 | 405 | 55 | 143 |
| 2 | 54 | 402 | 79 | 136 |
| 3 | 53 | 392 | 76 | 133 |
| 4 | 53 | 402 | 97 | 133.5 |
| 5 | 53 | 408 | 116 | 130 |
| 6 | 54 | 403 | 110 | 134.3 |
| 7 | 53 | 401 | 87 | 133.5 |
| 8 | 53 | 380 | 97.5 | 131 |
| 9 | 53 | 393 | 120 | 131 |
| 10 | 51 | 401 | 141 | 129.5 |

¹ This is here expressed as the number of minutes required to cause the viscosity of a mixture of 100 g. of the above prepared epoxy resin and 30 g. of phthalic anhydride heated to 120° C. to rise to 1,500 cp., a value at which the mixture is no longer workable.
² EM = exothermic maximum, viz. the highest temperature occurring during the above reaction for determining the working time.

EXAMPLE II

The effect of the period during which washing was acidified water occurs is shown in Table III. The epoxy resin used in this example was the same as that in Example I.

The properties of the products obtained are shown in Table IV below:

Table IV

| Product Treated According to Test | Melting point in ° C. | Epoxy equivalent weight | Working time in minutes¹ | EM² |
|---|---|---|---|---|
| 11 | 53 | 404 | 76 | 133 |
| 12 | 53 | 402 | 97 | 133.5 |
| 13 | 53 | 399 | 128 | 131.3 |
| 14 | 53 | 400 | 156 | 131 |

¹ For explanation see Table II, Example I.
² See note Table II.

The above Tables III and IV show that the working time of a mixture consisting of treated epoxy resin and, for example, phthalic anhydride can be increased by increasing the duration of the treatment with acidified water.

EXAMPLE II

A number of epoxy resins were prepared by condensing 2,2-bis-(4-hydroxyphenyl) propane (DPP) with epichlorohydrin (ECH) in the presence of NaOH. The ratio DPP:ECH:NaOH used, together with the method of adding alkali, is shown in Table V below. In adding alkali portionwise, the second portion was always added half an hour after the first; when not adding portionwise all the alkali was added at the commencement of the reaction. The other reaction conditions are similar to those of Example I. The resins prepared were washed in the manner described in Table V.

Table V

| Test | Mol Ratio of DPP: ECH:NaOH | Method of Adding Alkali | Washing treatment with distilled water for 10 minutes | | Temp. (° C.) at which washing was carried out with acid | After treatment with distilled H₂O for 10 minutes | |
|---|---|---|---|---|---|---|---|
| | | | Times | Temp., ° C. | | Times | Temp., ° C. |
| 15 | 1:1.57:1.79 | Whole quantity | 4 | 68-70 | 70 | 5 | 70 |
| 16 | 1:1.57:1.79 | In 2 portions (1.39+0.40) | 4 | 70 | 70 | 5 | 70 |
| 17 | 1:1.75:2.00 | Whole quantity | 4 | 62-70 | 65 | 6 | 65 |
| 18 | 1:1.75:2.00 | In 2 portions (1.39+0.61) | 4 | 60-65 | 65 | 5 | 65 |

In all the above cases the acid washing was carried out with distilled water to which sufficient formic acid had been added for the washing water obtained to have a pH of 2.7–3.1. This washing treatment lasted 30 minutes. The products were found to be excellently washable at 70° C. The properties of the products prepared and washed according to Table V are shown in Table VI.

Table VI

| Product Prepared and washed according to test | Melting Point, ° C. | Epoxy equivalent weight | Working time in minutes [1] | EM [2] |
|---|---|---|---|---|
| 15 | 65 | 449 | 126 | 129 |
| 16 | 61 | 433 | 152 | 129 |
| 17 | 57 | 403 | 132 | 128 |
| 18 | 52 | 372 | 190 | 129 |

[1] For explanation see footnote 1 Table II.
[2] See footnote 2 Table II.

The above Table VI clearly shows that the working time is longer when the ethoxyline condensate is prepared by adding alkali portionwise.

When the washing with acidified water in the treatments according to Table V was omitted, it was found that the second series of washing treatments could be carried out at a maximum temperature of 64° C.

On omitting the washing treatment with acid according to Table V, tests 15–18, the products obtained were found to have the properties mentioned in Table VII.

Table VII

| Test | Melting point, ° C. | Epoxy Equivalent Weight | Processing time in minutes [1] | EM [2] |
|---|---|---|---|---|
| 15 | 62 | 458 | 45 | 129 |
| 16 | 58 | 434 | 72 | 127 |
| 17 | 56 | 397 | 79 | 127 |
| 18 | 53 | 367 | 86 | 129 |

[1] For explanation see footnote 1 Table II.
[2] See footnote 2 Table II.

The above Table VII shows that when the washing treatment is not carried out with acidfied water, the working time is considerably shorter.

We claim as our invention:

1. A process for producing an epoxy resin composition containing a polycarboxylic acid anhydride having improved working time which comprises mixing the anhydride with an epoxy resin which is a glycidyl polyether of a polyhydric phenol and has an average of more than 1 epoxy group per molecule in an amount so as to provide about 0.75 to 1.25 anhydride groups per epoxide group, which epoxy resin had been prepared by condensing a polyhydric phenol with epichlorohydrin in the presence of an alkali metal hydroxide wherein the alkali metal hydroxide is added to the reaction mixture in small increments and has been washed with water acidified sufficiently that the pH of the obtained wash water is not higher than 5.5 for about 15 to 120 minutes, after which the excess acid is removed from the treated resin by repeated washing with water, said composition retaining mobile fluidity when molten for a substantially longer time than is the case with a corresponding composition containing epoxy resin which had not been subjected to said treatment with acidified water.

2. A process according to claim 1 wherein the anhydride is phthalic anhydride.

3. A process according to claim 1 wherein the anhydride is maleic anhydride.

4. A process for producing an epoxy resin composition containing a dicarboxylic acid anhydride having improved working time which comprises mixing such a quantity of the anhydride with an epoxy resin to amount to about 0.75 to 1.25 anhydride groups per epoxide groups, the epoxy resin having been obtained by condensing about 1.1 to 1.8 moles of epichlorohydrin with a mole of a dihydric phenol in the presence of an excess of alkali metal hydroxide to combine with the chlorine of the epichlorohydrin, said alkali metal hydroxide being added incrementally to the reaction mixture, and then the condensate is washed with water to remove salt and excess alkali, followed by washing the resulting epoxy resin with water acidified sufficiently that the pH of the obtained wash water is not higher than 5.5 for period of about 15 to 120 minutes, after which the excess acid is removed from the treated resin by repeated washing with water, said composition retaining mobile fluidity when molten for a substantially longer time that is the case with a corresponding composition containing epoxy resin which had not been subjected to said treatment with acidified water.

5. A process according to claim 4 wherein the obtained wash water from washing the epoxy resin with acidified water has a pH of about 2 to 4.5.

6. A process according to claim 4 wherein the washing of the epoxy resin with the acidified water is effected during a period of from about 30 to 120 minutes of time.

7. A process according to claim 4 wherein the anhydride is phthalic anhydride.

8. A process according to claim 4 wherein the anhydride is maleic anhydride.

9. A composition obtained by the process of claim 1.
10. A composition obtained by the process of claim 7.
11. A composition obtained by the process of claim 8.

References Cited in the file of this patent

UNITED STATES PATENTS

| 2,324,483 | Castan | July 20, 1943 |
| 2,686,771 | Whitehill et al. | Aug. 17, 1954 |
| 2,767,157 | Masters | Oct. 16, 1956 |

OTHER REFERENCES

Schrade: Kunstoffe, volume 43, 1953, pp. 266, 269. (Copy Science Library.)